United States Patent
Chen et al.

(10) Patent No.: US 10,216,665 B2
(45) Date of Patent: Feb. 26, 2019

(54) MEMORY DEVICE, MEMORY CONTROLLER, AND CONTROL METHOD THEREOF

(71) Applicant: Realtek Semiconductor Corporation, Hsinchu (TW)

(72) Inventors: Yen-Chung Chen, Hsinchu County (TW); Li-Chun Huang, Yunlin County (TW); Wang-Sheng Lin, New Taipei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 156 days.

(21) Appl. No.: 15/361,474

(22) Filed: Nov. 27, 2016

(65) Prior Publication Data
US 2017/0337146 A1    Nov. 23, 2017

(30) Foreign Application Priority Data
May 18, 2016    (TW) .............................. 105115359 A

(51) Int. Cl.
G06F 13/26    (2006.01)
G06F 3/06    (2006.01)
G06F 13/16    (2006.01)

(52) U.S. Cl.
CPC .............. *G06F 13/26* (2013.01); *G06F 3/061* (2013.01); *G06F 3/0611* (2013.01); *G06F 3/0659* (2013.01); *G06F 3/0679* (2013.01); *G06F 3/0685* (2013.01); *G06F 3/0688* (2013.01); *G06F 13/1694* (2013.01)

(58) Field of Classification Search
None
See application file for complete search history.

(56) References Cited

U.S. PATENT DOCUMENTS

| | | | | |
|---|---|---|---|---|
| 5,206,933 | A * | 4/1993 | Farrell | H04L 29/06 370/463 |
| 5,987,621 | A * | 11/1999 | Duso | G06F 11/2023 348/E5.008 |
| 6,230,200 | B1 * | 5/2001 | Forecast | G06F 9/50 709/219 |
| 2002/0103943 | A1 * | 8/2002 | Lo | H04L 29/06 710/2 |
| 2004/0117579 | A1 * | 6/2004 | Wu | G06F 11/2071 711/170 |
| 2007/0276976 | A1 * | 11/2007 | Gower | G06F 13/4243 710/305 |
| 2011/0041005 | A1 * | 2/2011 | Selinger | G06F 11/10 714/719 |
| 2011/0041039 | A1 * | 2/2011 | Harari | G06F 11/1068 714/773 |

(Continued)

FOREIGN PATENT DOCUMENTS

TW    201135598 A    10/2011
TW    201438013 A    10/2014

*Primary Examiner* — Michael Sun
(74) *Attorney, Agent, or Firm* — CKC & Partners Co., LLC

(57) ABSTRACT

A control method includes detecting an operational command to a first memory unit, interrupting an operational status of a second memory unit, asserting the operational command corresponding to the first memory unit, and recovering the operational status of the second memory unit. The first memory unit and the second memory unit correspond to the same channel.

19 Claims, 5 Drawing Sheets

(56) References Cited

U.S. PATENT DOCUMENTS

| | | | |
|---|---|---|---|
| 2014/0137119 A1* | 5/2014 | Hyde | G06F 9/46 |
| | | | 718/100 |
| 2014/0281071 A1* | 9/2014 | Xu | G06F 13/42 |
| | | | 710/105 |
| 2014/0325131 A1* | 10/2014 | Lassa | G06F 9/4843 |
| | | | 711/103 |
| 2016/0283399 A1* | 9/2016 | Das Sharma | G06F 12/1072 |

* cited by examiner

MEMORY DEVICE, MEMORY CONTROLLER, AND CONTROL METHOD THEREOF

RELATED APPLICATIONS

This application claims priority to Taiwan Application Serial Number, 105115359, filed May 18, 2016, which is herein incorporated by reference.

BACKGROUND

Technical Field

The present disclosure relates to a memory device. More particularly, the present disclosure relates to a memory controller and a control method thereof.

Description of Related Art

Flash memory devices have been widely utilized. In general, a memory device is configured to a have a memory controller for controlling multiple flash memory dies of multiple channels.

Generally speaking, the memory controller is required to assert another access command corresponding to a flash memory die after a current access command on the flash memory die is ended. Moreover, at any specific point in time, the memory controller is only able to make one of the multiple flash memory dies in the same channel transmit data. In some approaches, the memory controller is configured to make the flash memory dies in the same channel enter a busy status at the same time. However, due to the limitation of the memory controller discussed above, and with the increase in data throughput of a processor coupled to the memory device, it is difficult to make the flash memory dies in the same channel enter the busy status at the same time. As a result, the data transmission efficiency is reduced.

SUMMARY

An aspect of the present disclosure is to provide a control method. The control method includes detecting an operational command to a first memory unit, interrupting an operational status of a second memory unit, asserting the operational command corresponding to the first memory unit, and recovering the operational status of the second memory unit. The first memory unit and the second memory unit correspond to the same channel.

Another aspect of the present disclosure is to provide a memory controller. The memory controller includes a command circuit and a detect circuit. The command circuit is configured to transmit an operational command to a first memory unit of memory units according to an external command, in which the memory units correspond to the same channel. The detect circuit is configured to detect an operational status of a second memory unit of the memory units. The command circuit is further configured to interrupt the operational status of the second memory unit to assert the operational command corresponding to the first memory unit, and recover the operational status of the second memory unit after the operational command is asserted and transmitted to the first memory unit.

Yet aspect of the present disclosure is to provide a memory device. The memory device includes a first memory unit, a second memory unit, and a memory controller. The memory controller is configured to interrupt an operational status of the second memory unit to assert an operational command corresponding to the first memory unit, and to recover the operational status of the second memory unit after the operational command is asserted and transmitted to the first memory unit.

As discussed above, the memory controller and the control method of the present disclosure are able to instantly detect the operational status of the memory unit, in order to shorten the time for asserting the command corresponding to the memory unit. As a result, the transmission efficiency of the memory device is improved.

BRIEF DESCRIPTION OF THE DRAWINGS

This disclosure can be more fully understood by reading the following detailed description of the embodiment, with reference made to the accompanying drawings as follows.

DETAILED DESCRIPTION

Although the terms "first," "second," etc., may be used herein to describe various elements, these elements should not be limited by these terms. These terms are used to distinguish one element from another.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other.

Figure 1:
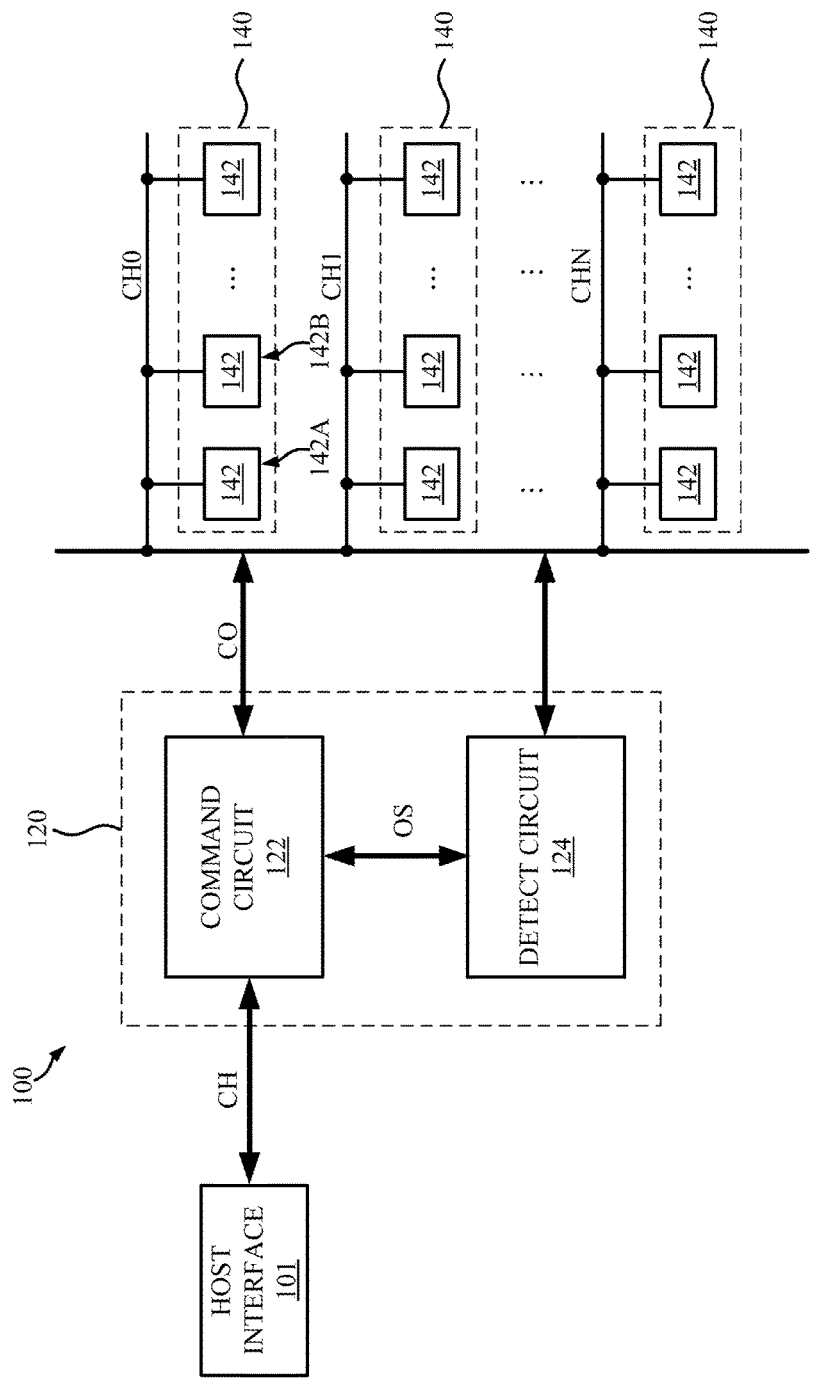
FIG. 1 is a schematic diagram of a memory device, according to some embodiments of the present disclosure.

Reference is made to FIG. 1 which is a schematic diagram of a memory device 100 according to some embodiments of the present disclosure. The memory device 100 includes a memory controller 120 and memory groups 140.

The memory controller 120 is coupled to a host interface 101 to receive an external command CH. In some embodiments, the host interface 101 is further coupled to a processing unit and/or at least one input/output device, to transmit the external command CH. In some embodiments, the host interface 101 includes a serial attached SCSI (SAS), a serial advanced technology attachment (SATA) interface, and/or an advanced host controller interface (AHCI).

The memory controller 120 is coupled to the memory groups 140. The memory groups 140 correspond to channels CH0-CHN respectively, and each of the memory groups 140 includes memory units 142. In some embodiments, the memory units 142 are flash memory. In some other embodiments, the flash memory includes NAND flash memory. Such implementations of the memory units 142 are given for illustrative purposes, and various types of the memory units 142 are within the contemplated scope of the present disclosure.

In some embodiments, the memory controller 120 includes a command circuit 122 and a detect circuit 124. The command circuit 122 is coupled to the memory units 142. The command circuit 122 is coupled to the host interface 101 to receive the external command CH. The command circuit 122 generates an operational command CO and transmits the same to a corresponding memory unit 142 according to the external command CH. In some embodiments, the operational command CO includes a read command, a write command, an erase command, etc.

The detect circuit 124 is coupled to the memory units 142, and is configured to detect operational statuses OS of the memory units 142. In some embodiments, the detect circuit 124 is configured to poll the memory units 142 to obtain the operational statuses OS of the memory units 142. In some embodiments, the detect circuit 124 is coupled to the command circuit 122, in order to report the operational statuses OS back to the command circuit 122. In some embodiments, the command circuit 122 is configured to determine whether to interrupt the memory unit 142 which is currently operating according to the operational statuses OS, in order to assert a new operational command CO corresponding to another memory unit 142. The related operations are described in more detail with reference to FIG. 3 below. In some embodiments, the memory units 142 are able to output different flags via a flag register to indicate the operational statuses OS thereof. In some other embodiments, the memory units 142 are able to toggle at least one external hardware pin, which includes, for example, pins that are connected with address lines and/or control lines, to indicate the operational statuses OS thereof.

The above arrangements for detecting the operational statuses OS are given for illustrative purposes only. Various interactions which are able to be applied to the memory controller 120 and the memory units 142 are within the scope of the present disclosure.

Figure 2A:
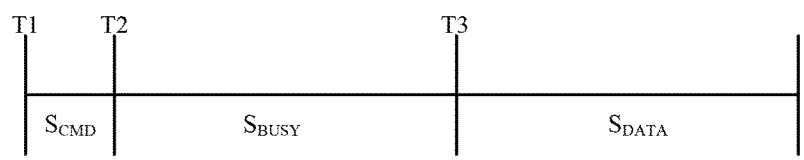
FIG. 2A is a timing diagram illustrating a read operation of the memory unit in FIG. 1, according to some embodiments of the present disclosure.

Reference is made to FIG. 2A which is a timing diagram illustrating a read operation of the memory unit 142 in FIG. 1, according to some embodiments of the present disclosure. As described above, the command circuit 122 transmits the operational command CO to the corresponding memory unit 142 according to the external command CH. In the example of FIG. 2A, the operational command CO is a read command. As shown in FIG. 2A, at time T1, the memory unit 142 enters a commanding status $S_{CMD}$. In some embodiments, the commanding status $S_{CMD}$ indicates that the corresponding memory unit 142 is currently asserted by the operational command CO from the command circuit 122. At time T2, the memory unit 142 enters a busy status $S_{BUSY}$. In some embodiments, the busy status $S_{BUSY}$ indicates that the corresponding memory cell 142 is currently transmitting data stored therein to a buffer (not shown). At time T3, the memory unit 142 enters a data-transmission status $S_{DATA}$. In some embodiments, the data-transmission status $S_{DATA}$ indicates that the data which are transmitted to the buffer are currently read.

Figure 2B:
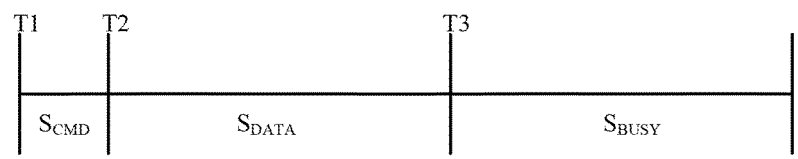
FIG. 2B is a timing diagram illustrating a write operation of the memory unit in FIG. 1, according to some embodiments of the present disclosure.

Reference is made to FIG. 2B which is a timing diagram illustrating a write operation of the memory unit 142 in FIG. 1, according to some embodiments of the present disclosure. In the example of FIG. 2B, the operational command CO is a write command. As shown in FIG. 2B, at time T0, the memory unit 142 enters a commanding status $S_{CMD}$. At time T1, the memory unit 142 enters the data-transmission status $S_{DATA}$. In some embodiments, the data-transmission status $S_{DATA}$ indicates that the data which are expected to be written are currently transmitting to a buffer (not shown) of the corresponding memory unit 142. At time T2, the memory unit 142 enters the busy status $S_{BUSY}$. In some embodiments, the busy status $S_{BUSY}$ indicates that the data which are transmitted to the buffer are currently writing into the corresponding memory unit 142.

In some approaches, during a single time interval, the memory controller is only able to set one of the memory units 142 of the same channel (i.e., belonging to the same memory group 140) to perform the data-transmission operation. In such approaches, the memory controller is able to access data after the busy status of the memory unit is ended, and to assert another command corresponding to another one of the memory units of the same channel.

As described above, the command circuit 122 is able to interrupt the memory unit 142 which is currently operating according to the operational status OS, in order to assert a new operational command CO corresponding to another memory unit 142. With such an arrangement, another memory unit 142 is able to enter the busy status $S_{BUSY}$ and/or the data-transmission status $S_{DATA}$ more quickly and efficiently. Compared with the approaches above, the transmission efficiency of a single channel of the memory device 100 of the present disclosure can be improved.

Figure 3:
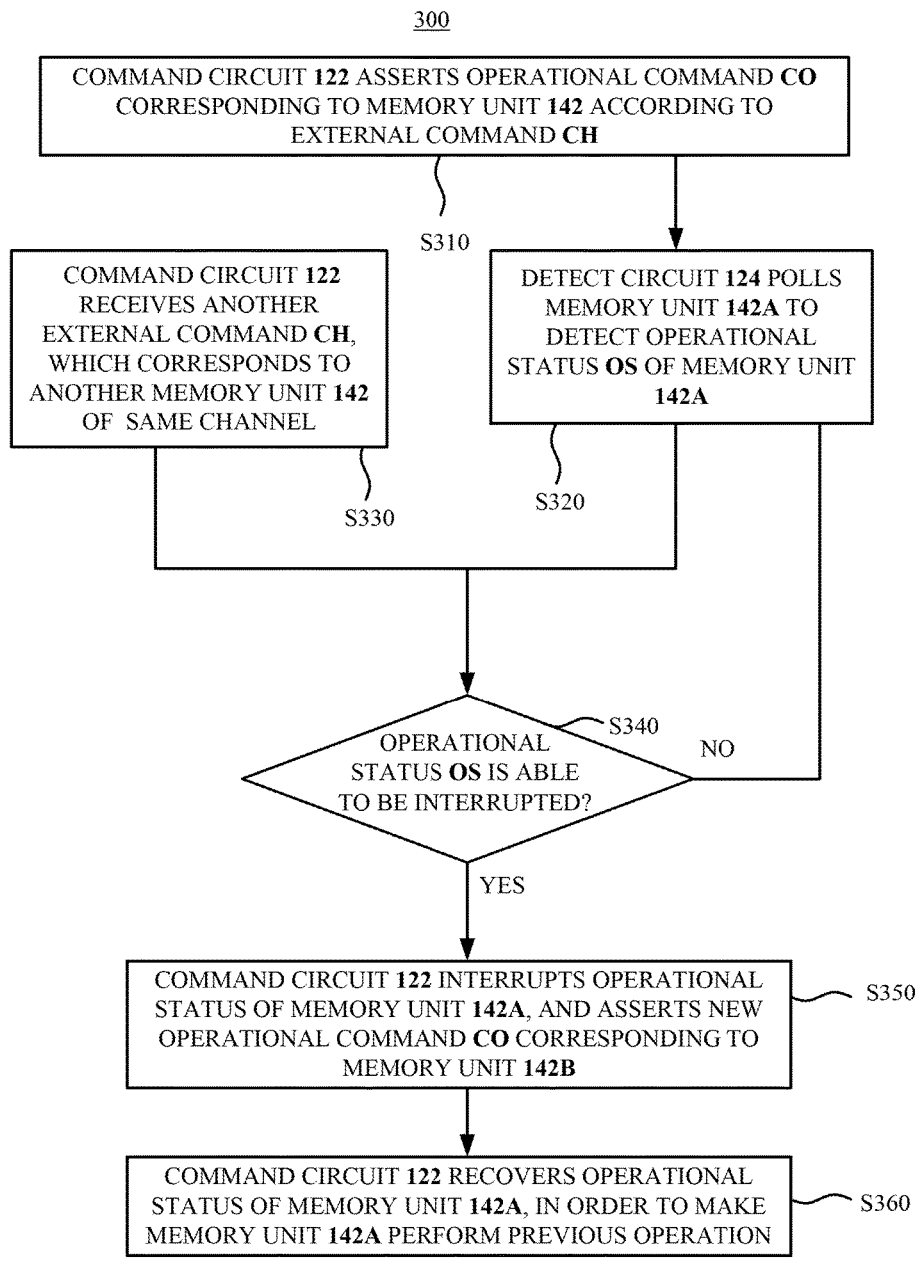
FIG. 3 is a flow chart of a method for controlling a memory device, according to some embodiments of the present disclosure.
Figure 4:
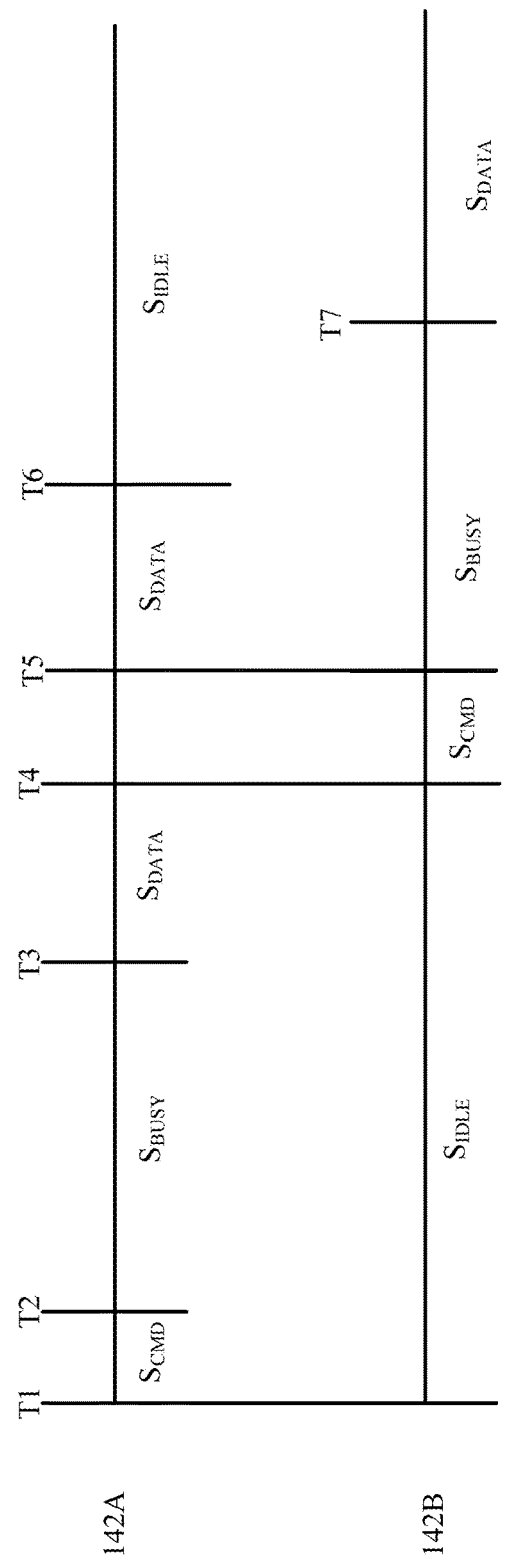
FIG. 4 is a timing diagram illustrating two successive read operations performed by the memory device in FIG. 1, according to some embodiments of the present disclosure.

FIG. 3 is a flow chart of a method 300 for controlling a memory device, according to some embodiments of the present disclosure. FIG. 4 is a timing diagram illustrating two successive read operations performed by the memory device 100 in FIG. 1, according to some embodiments of the present disclosure. Reference is made to FIGS. 1, 3, and 4, in order to illustrate related operations of the memory controller 120. In some embodiments, the control method 300 includes operations S310-S360.

In operation S310, the command circuit 122 asserts the operational command CO corresponding to a corresponding memory unit 142 according to the external command CH. In the example of FIG. 4, the external command CH is a read command, and the corresponding operating command CO is asserted by the command circuit 122 and transmitted to a memory unit 142 (hereinafter referred to as a memory unit 142A) of the channel CH0. As shown in FIG. 4, at time T1, the memory unit 142A enters the commanding status $S_{CMD}$.

In operation S320, the detect circuit 124 polls the memory unit 142A to detect the operational status OS of the memory unit 142A. As shown in FIG. 4, at time T2, the memory unit 142A enters the busy status $S_{BUSY}$. At time T3, the memory unit 142A enters the data-transmission status $S_{DATA}$. As described above, in some embodiments, the detect circuit 124 can poll the memory unit 142A to determine which operational status the memory unit 142A is currently in.

In operation S330, the command circuit 122 receives another external command CH which corresponds to another memory unit 142 of the same channel. In the example of FIG. 4, at time T4, the command circuit 122 receives a read command which is asserted to access another memory unit 142 (hereinafter referred to as memory unit 142B) of the channel CH0.

In operation S340, the command circuit 122 determines whether the operational status OS of the memory unit 142A is able to be interrupted. If yes, operation S350 is performed. Otherwise, operation S320 is performed again. In operation S350, the command circuit 122 interrupts the operational status of the memory unit 142A, and asserts the new operational command CO corresponding to the memory unit 142B.

In the example of FIG. 4, at time T4, the command circuit 122 receives the external command CH which is asserted to access the memory unit 142B. At the same time, the detect circuit 124 determines that the memory unit 142A is currently at the data-transmission status $S_{DATA}$, and the memory unit 142B is currently at an idle status $S_{IDLE}$. Therefore, at time T4, the command circuit 122 interrupts the current data-transmission status of the memory unit 142A, in order to assert the operational command CO corresponding to the memory unit 142B. Accordingly, the memory unit 142B enters the commanding status $S_{CMD}$.

In operation S360, the command circuit 122 recovers the operational status of the memory unit 142A, in order to make the memory unit 142A perform the previous operation. For illustration, as shown in FIG. 4, at time T5, the command circuit 122 recovers the data-transmission status $S_{DATA}$ of the memory unit 142A, in order to make the memory unit 142A perform the previous transmitting operation.

With the operations above, the memory unit 142A and the memory unit 142B can operate together in a certain time interval, such that the transmission efficiency of the channel CH0 is increased. For illustration, at time T5, the memory unit 142A is recovered back to the data-transmission status $S_{DATA}$, in order to transmit the data via a data bus corresponding to the channel CH0. During a time interval that the memory unit 142A is recovered back to the data-transmission status $S_{DATA}$, the memory unit 142B has entered the busy status $S_{BUSY}$ already. At time T6, the data of the memory unit 142A are completely transmitted. Therefore, after the busy status of the memory unit 142B is ended, the memory unit 142B is able to enter the data-transmission status $S_{DATA}$ at time T7 immediately, in order to transmit the data via the data bus corresponding to the channel CH0. As a result, an amount of data transmission of the channel CH0 during the same time interval can be increased.

Figure 5:
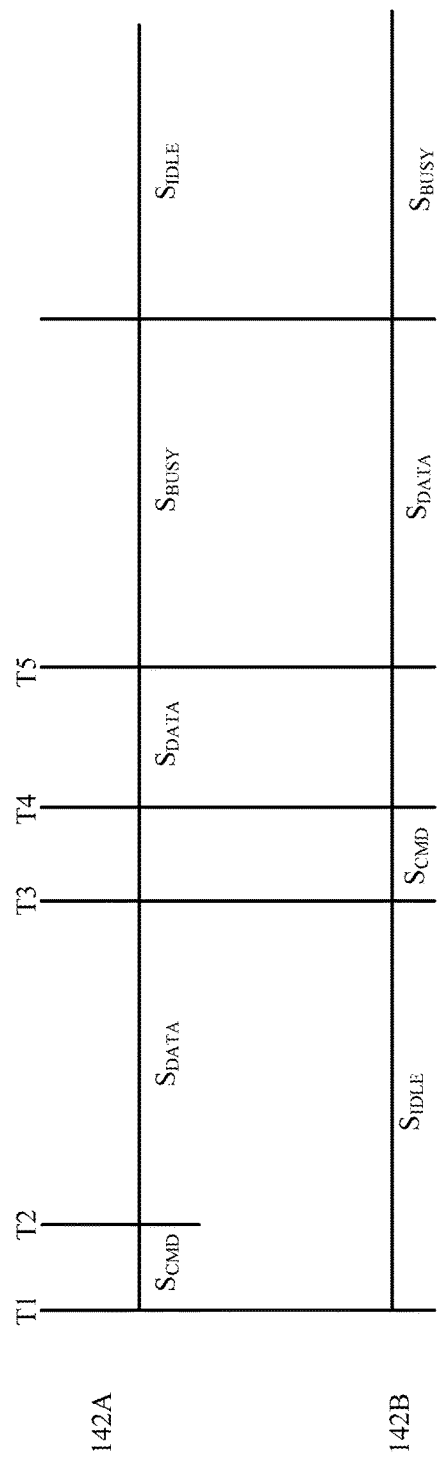
FIG. 5 is a timing diagram illustrating two successive write operations performed by the memory device in FIG. 1, according to some embodiments of the present disclosure.

FIG. 5 is a timing diagram illustrating two successive write operations performed by the memory device 100 in FIG. 1, according to some embodiments of the present disclosure. Reference is made to FIGS. 1, 3, and 5, in order to illustrate related operations of the memory controller 120. In the example of FIG. 5, the external command CH is a write command, and the corresponding operational command is asserted by the command circuit 122 and transmitted to the memory unit 142A of the channel CHO (i.e., operation S310). As shown in FIG. 5, at time T1, the memory unit 142A enters the commanding status $S_{CMD}$. At time T2, the memory unit 142A enters the data-transmission status $S_{DATA}$.

At time T3, the command circuit 122 receives a write command that is asserted to write data into the memory unit 142B (i.e., operation S330). At the same time, the detect circuit 124 determines that the memory unit 142A is currently at the data-transmission status $S_{DATA}$ (i.e., operation S320), and determines that the memory unit 142B is at the idle status $S_{IDLE}$. Therefore, at time T3, the command circuit 122 interrupts the current data-transmission status $S_{DATA}$ to assert the operational command CO corresponding to the memory unit 142B (i.e., operations S340 and S350). Accordingly, the memory unit 142B enters the commanding status $S_{CMD}$. Next, at time T4, the command circuit 122 recovers the data-transmission status $S_{DATA}$ of the memory unit 142A, in order to make the memory unit 142A perform the previous data-transmission operation (i.e., operation S360).

Alternatively, in some other embodiments, at time T4, the command circuit 122 is able to make the memory unit 142B enter the data-transmission status $S_{DATA}$ first, and then recovers the data-transmission status $S_{DATA}$ of the memory unit 142A after the memory unit 142B enters the busy status $S_{BUSY}$.

FIGS. 2A, 2B, 4, and 5 are given for illustrative purposes only. For ease of understanding, buffering time intervals and/or transient time intervals between each operational status are not shown in the drawings above. In addition, the time intervals between each operational status in the drawings above are also given for illustrative purposes only. Persons skilled in the art would appreciate that each operational status of the memory device will have a different time interval according to practical applications, and thus various time intervals of each operational status are within the contemplated scope of the present disclosure.

For example, in some other embodiments, time T6 and time T4 in FIG. 4 can be aligned with each other. In other words, the memory unit 142B enters the data-transmission status $S_{DATA}$ immediately after the recovered data-transmission status $S_{DATA}$ of the memory unit 142A is ended. Persons skilled in the art are able to understand other arrangements of each operational status according the drawings above, and thus the present disclosure is not limited to the embodiments of the drawings above.

In various embodiments, the memory controller 120 can be implemented with software, hardware, and/or firmware. For example, the memory controller 120 can be implemented with digital circuits that perform the method 300. In some other embodiments, each unit of the memory controller 120 is also able to be implemented through cooperation of software, hardware, and firmware. Persons skilled in the art are able to choose the implementations for the memory controller 120 according to the requirements of practical applications.

The above examples, which are described with successive operations of two read commands or with successive operations of two write commands, are given for illustrative purposes only. Various types of the operational command CO and performing orders are within the contemplated scope of the present disclosure. In various embodiments, the performing order includes performing successive write commands and read commands, in which the data-transmission status $S_{DATA}$ or the busy status $S_{BUSY}$ of the write operation is interrupted to assert a new read command. In some other embodiments, the performing order includes performing successive write commands and erase commands, in which the data-transmission status $S_{DATA}$ or the busy status $S_{BUSY}$ of the write operation is interrupted to assert a new erase command. In yet some other embodiments, the performing order includes performing successive read commands and erase commands, in which the data-transmission status $S_{DATA}$ or the busy status $S_{BUSY}$ of the read operation is interrupted to assert a new erase command.

As discussed above, the memory controller and the control method of the present disclosure are able to instantly detect the operational status of the memory unit, in order to shorten the time for asserting the command corresponding to the memory unit. As a result, the transmission efficiency of the memory device is improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A control method, comprising:
  detecting an operational command to a first memory unit;
  interrupting an operational status of a second memory unit performing with a write operation or a read operation;
  asserting the operational command corresponding to the first memory unit; and
  recovering the operational status of the second memory unit,
  wherein the first memory unit and the second memory unit are different memory units corresponding to the same channel.

2. The control method of claim 1, wherein the operation of interrupting the operational status of the second memory unit comprises:
  determining whether the operational status of the second memory unit is able to be interrupted; and
  interrupting the operational status of the second memory unit in a condition that the operational status of the second memory unit is a data-transmission status.

3. The control method of claim 2, further comprising:
  interrupting the data-transmission status of the second memory unit, in a condition that the second memory unit is currently in the data-transmission status and the first memory unit is currently in an idle status.

4. The control method of claim 2, wherein the operation of determining the operational status of the second memory unit comprises:
  polling the second memory unit to detect the operational status of the second memory unit.

5. The control method of claim 1, wherein the operational command is a read command, the operational status is a data-transmission status, and the control method further comprises:
  after a recovered data-transmission status of the second memory unit is ended, making the first memory unit enter the data-transmission status.

6. The control method of claim 5, wherein during a time interval of the recovered data-transmission status of the second memory unit, the first memory unit enters a busy status.

7. A memory controller, comprising:
  a command circuit configured to transmit an operational command to a first memory unit of a plurality of memory units according to an external command, wherein the memory units are different memory units corresponding to the same channel; and
  a detect circuit configured to detect an operational status of a second memory unit, performing with a write operation or a read operation, of the memory units;
  wherein the command circuit is further configured to interrupt the operational status of the second memory unit to assert the operational command corresponding to the first memory unit, and recover the operational status of the second memory unit after the operational command is asserted and transmitted to the first memory unit.

8. The memory controller of claim 7, wherein the command circuit is configured to interrupt the operational status of the second memory unit in a condition that the operational status of the second memory unit is a data-transmission status.

9. The memory controller of claim 8, wherein the command circuit is further configured to interrupt the data-transmission status of the second memory unit, in a condition that the operational status of the second memory unit is the data-transmission status and the first memory unit is currently in an idle status.

10. The memory controller of claim 7, wherein the detect circuit is configured to poll the second memory unit to detect the operational status of the second memory unit.

11. The memory controller of claim 7, wherein the operational command is a read command, the operational status is a data-transmission status, and the command circuit is further configured to make the first memory unit enter the data-transmission status after a recovered data-transmission status of the second memory unit is ended.

12. The memory controller of claim 11, wherein during a time interval of the recovered data-transmission status of the second memory unit, the first memory unit enters a busy status.

13. A memory device, comprising:
  a first memory unit;
  a second memory unit; and
  a memory controller configured to interrupt an operational status of the second memory unit performing with a write operation or a read operation, in order to assert an operational command corresponding to the first memory unit, and to recover the operational status of the second memory unit after the operational command is asserted and transmitted to the first memory unit,
  wherein the first memory unit and the second memory unit are different memory units corresponding to the same channel.

14. The memory device of claim 13, wherein the memory controller is further configured to determine whether the operational status of the second memory unit is able to be interrupted, and configured to interrupt the operational status of the second memory unit in a condition that the operational status of the second memory unit is a data-transmission status.

15. The memory device of claim 14, wherein the memory controller is further configured to interrupt the operational status of the second memory unit, in a condition that the second memory unit is currently in the data-transmission status and the first memory unit is currently in an idle status.

16. The memory device of claim 14, wherein the operational command is a read command, the operational status is a data-transmission status, and the memory controller is further configured to make the first memory unit enter the data-transmission status after a recovered data-transmission status of the second memory unit is ended.

17. The memory device of claim 16, wherein during a time interval of the recovered data-transmission status of the second memory unit, the first memory unit enters a busy status.

18. The memory device of claim 13, wherein the memory controller comprises:
  a command circuit configured to transmit the operational command to the first memory unit according to an external command; and
  a detect circuit configured to detect the operational status of the second memory unit.

19. The memory device of claim 18, wherein the detect circuit configured to poll the second memory unit to detect the operational status of the second memory unit.

* * * * *